(12) United States Patent
Liu et al.

(10) Patent No.: US 11,392,405 B2
(45) Date of Patent: Jul. 19, 2022

(54) METHOD AND APPARATUS FOR SECURELY ENTERING TRUSTED EXECUTION ENVIRONMENT IN HYPER- THREADING SCENARIO

(71) Applicant: Alipay (Hangzhou) Information Technology Co., Ltd., Zhejiang (CN)

(72) Inventors: Xiaojian Liu, Zhejiang (CN);
Shoumeng Yan, Zhejiang (CN);
Zongmin Gu, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/356,280

(22) Filed: Jun. 23, 2021

(65) Prior Publication Data
US 2022/0066809 A1    Mar. 3, 2022

(30) Foreign Application Priority Data
Aug. 28, 2020  (CN) .......................... 202010888591.6

(51) Int. Cl.
*G06F 9/455* (2018.01)
*G06F 21/57* (2013.01)

(52) U.S. Cl.
CPC .......... *G06F 9/45558* (2013.01); *G06F 21/57* (2013.01); *G06F 2009/45587* (2013.01); *G06F 2221/034* (2013.01)

(58) Field of Classification Search
None
See application file for complete search history.

(56) References Cited

U.S. PATENT DOCUMENTS

| 10,733,285 B1* | 8/2020 | Liu ........................ G06F 21/57 |
| 11,113,400 B1* | 9/2021 | Emelyanov ............. G06F 21/64 |

(Continued)

FOREIGN PATENT DOCUMENTS

| CN | 106687938 A | 5/2017 |
| CN | 108509251 A | 9/2018 |

(Continued)

OTHER PUBLICATIONS

Chen, Guoxing et al., "Racing in Hyperspace: Closing Hyper-Threading Side Channels on SGX with Contrived Data Races", 2018 IEEE Symposium on Security and Privacy, May 20, 2018, pp. 178-194.

(Continued)

*Primary Examiner* — Wynuel S Aquino
(74) *Attorney, Agent, or Firm* — Seed IP Law Group LLP (57) ABSTRACT

One or more implementations of the present specification provide a method and apparatus for securely entering a trusted execution environment in a hyper-threading scenario. The method can include: in response to that a logical processor running on a physical processor core generates a trusted execution environment entry event through an approach provided by a virtual machine monitor, labeling the logical processor with a state of expecting to enter a trusted execution environment; and in response to determining that all logical processors corresponding to the physical processor core are labeled with the state of expecting to enter a trusted execution environment, separately controlling each one of the logical processors to enter a trusted execution environment built on the physical processor core. In either a privacy blockchain scenario or other privacy protection scenarios, the solution above can allow the hyper-threading technology to be enabled to improve computing efficiency while ensuring that a trusted application exclusively occu- (Continued)

pies a physical processor core to avoid a risk of privacy leakage.

20 Claims, 3 Drawing Sheets

(56) References Cited

U.S. PATENT DOCUMENTS

| | | | | |
|---|---|---|---|---|
| 2013/0159726 A1* | 6/2013 | McKeen | ............... | G06F 21/53 |
| | | | | 713/189 |
| 2017/0185776 A1* | 6/2017 | Robinson | .............. | G06F 21/575 |
| 2019/0155714 A1* | 5/2019 | Zhang | .................. | G06F 9/4401 |
| 2019/0196982 A1* | 6/2019 | Rozas | .................. | G06F 12/145 |

FOREIGN PATENT DOCUMENTS

| | | |
|---|---|---|
| CN | 109359487 A | 2/2019 |
| CN | 109947666 A | 6/2019 |
| CN | 110119302 A | 8/2019 |

OTHER PUBLICATIONS

Ngoc, Tu Dinh et al., "Everything You Should Know About Intel SGX Performance on Virtualized Systems", Proceedings of the ACM on Measurement and Analysis of Computing Systems, vol. 3, No. 1, Mar. 26, 2019, pp. 1-21.

Oleksenko, Oleksii et al., "Protecting SGX Enclaves From Practical Side-Channel Attacks", Usenix, The Advanced Computing Systems Association, Jul. 11, 2018, pp. 238-250.

* cited by examiner

| In response to that a logical processor running on the physical processor core generates a trusted execution environment exit event, label the logical processor that generates the trusted execution environment exit event with a state of expecting to exit a trusted execution environment, or clear the state of expecting to enter a trusted execution environment with which the logical processor that generates the trusted execution environment exit event is labeled | ~ 402 |
|---|---|

| Separately control each logical processor to exit the trusted execution environment built on the physical processor core in response to determining that all the logical processors corresponding to the physical processor core are labeled with the state of expecting to exit a trusted execution environment or the state of expecting to enter a trusted execution environment with which all the logical processors corresponding to the physical processor core are labeled has been cleared | ~ 404 |
|---|---|

METHOD AND APPARATUS FOR SECURELY ENTERING TRUSTED EXECUTION ENVIRONMENT IN HYPER- THREADING SCENARIO

BACKGROUND

Technical Field

One or more implementations of the present specification relate to the field of trusted computing technologies, and in particular, to a method and apparatus for securely entering a trusted execution environment in a hyper-threading scenario.

Description of the Related Art

Trusted execution environments (TEEs) can play a role of a black box in hardware. Neither code nor data executed in the TEEs can be snooped by an operating system layer. An operation can be performed on the code or data only by using an interface predefined in code. In terms of efficiency, due to a TEE s blackbox nature, a plaintext data operation instead of a complex cryptographic operation in homomorphic encryption is performed in the TEE, and no efficiency loss occurs in a computing process. Therefore, in combination of the TEE, security and privacy of a blockchain can be greatly improved under the premise of a small performance loss. At present, the industry pays great attention to TEE solutions, and almost all mainstream chip and software alliances have their own TEE solutions, including Trusted Platform Module (TPM) for software, and Intel Software Guard Extensions (SGX), ARM TrustZone, and AMD Platform Security Processor (PSP) for hardware.

The hyper-threading (HT) technology is also widely used to improve the operation efficiency of physical processor cores. The HT technology simulates multiple logical cores inside a multi-threaded processor into multiple physical chips, so that a single physical processor core can implement thread-level parallel computing to support multiple logical processors, namely, multiple hyper-threads. Certainly, the multiple logical processors only exclusively occupy resources such as register files, but need to share other computing resources such as level 1 caches and branch predictors, which may cause certain security risks when the HT technology is combined with the TEE technology.

BRIEF SUMMARY

One or more implementations of the present specification provide a method and apparatus for securely entering a trusted execution environment in a hyper-threading scenario.

One or more implementations of the present specification provide the following technical solutions.

According to a first aspect of one or more implementations of the present specification, a method for securely entering a trusted execution environment in a hyper-threading scenario is proposed, including: in response to that a logical processor running on a physical processor core generates a trusted execution environment entry event through an approach provided by a virtual machine monitor, labeling the logical processor with a state of expecting to enter a trusted execution environment; and in response to determining that all logical processors corresponding to the physical processor core are labeled with the state of expecting to enter a trusted execution environment, separately controlling each one of the logical processors to enter a trusted execution environment built on the physical processor core.

According to a second aspect of one or more implementations of the present specification, an apparatus for securely entering a trusted execution environment in a hyper-threading scenario is proposed, including: a label unit, configured to: in response to that a logical processor running on a physical processor core generates a trusted execution environment entry event through an approach provided by a virtual machine monitor, label the logical processor with a state of expecting to enter a trusted execution environment; and a control unit, configured to: in response to determining that all logical processors corresponding to the physical processor core are labeled with the state of expecting to enter a trusted execution environment, control each one of the logical processors to enter a trusted execution environment built on the physical processor core.

According to a third aspect of one or more implementations of the present specification, an electronic device is proposed, including: a processor; and a memory, configured to store an instruction executable by the processor, where the processor runs the executable instruction to implement the method according to the first aspect.

According to a fourth aspect of one or more implementations of the present specification, a computer-readable storage medium is proposed, where the computer-readable storage medium stores a computer instruction, and when the instruction is executed by a processor, steps of the method according to the first aspect are implemented.

DETAILED DESCRIPTION

Example implementations are described in detail herein, and examples of the example implementations are presented in the accompanying drawings. When the following description relates to the accompanying drawings, unless specified otherwise, the same numbers in different accompanying drawings represent the same or similar elements. Implementation manners described in the example implementations below do not represent all implementation manners consistent with one or more implementations of the present specification. On the contrary, the implementation manners are only examples of apparatuses and methods that are described in the appended claims in detail and consistent with some aspects of one or more implementations of the present specification.

It should be noted that, steps of a corresponding method in another implementation are not necessarily performed in a sequence shown and described in the illustrative implementations of present specification. In some other implementations, the method can include more or less steps than those described in the present specification. In addition, a single step described in the present specification may be divided into multiple steps for description in other implementations; and multiple steps described in the present specification may be combined into a single step for description in other implementations.

Trusted execution environment (TEE) is a security extension based on CPU hardware, and is a trusted execution environment totally isolated from the outside. The TEE is a concept originally proposed by Global Platform, which is used to address security isolation of resources on mobile devices, and provides a trusted and secure execution environment for application programs in parallel with an operating system. ARM's Trust Zone technology is the first to implement a truly commercial TEE technology.

With rapid development of the Internet, security requirements become increasingly higher. Not only mobile devices and cloud devices but also data centers raise more requirements on the TEE. The concept of the TEE has also been rapidly developed and expanded. The scope of TEE now is broader than the original concept. For example, server chip manufacturers Intel and AMD have successively launched hardware-assisted TEEs, which enrich the concept and features of TEE and are widely recognized in the industry. The TEE mentioned now usually refers more to this type of hardware-assisted TEE technology. Unlike mobile ends, cloud ends need to be accessed remotely, and a hardware platform is invisible to terminal users. Therefore, the first step in using the TEE is to confirm authenticity and trustiness of the TEE. Therefore, current TEE technologies all introduce a remote attestation mechanism: endorsement by hardware manufacturers (mainly CPU manufacturers) and a digital signature technology are used to ensure that users can verify a TEE status. In addition, secure resource isolation only cannot meet the security requirements, and data privacy protection is further proposed. Commercial TEEs including Intel SGX and AMD SEV each provide a memory encryption technology, so that trusted hardware is limited to inside a CPU, and both bus and memory data is ciphertext to prevent snooping by malicious users. For example, TEE technologies such as Intel Software Guard Extensions (SGX) isolate code execution, remote attestation, security configuration, secure storage of data, and trusted approaches used for code execution. Application programs running in the TEE are subject to security protection and can hardly be accessed by third parties.

In an example of the Intel SGX technology, a TEE provided by SGX is an enclave, namely, an encrypted trusted execution area in a memory, so that a CPU provides data protection against theft. For example, a CPU that supports SGX is used. In this case, a newly added processor instruction can be used to allocate a part of an area, namely, an enclave page cache (EPC) in a memory, and a memory encryption engine (MEE) inside the CPU can be used to encrypt data inside the EPC. Encrypted content in the EPC is decrypted into plaintext only after entering the CPU. Therefore, in SGX, users can distrust an operating system and even a basic input output system (BIOS). Nevertheless, the users can still ensure no leakage of privacy data, provided that they trust the CPU. In practice, privacy data can be encrypted and sent to an enclave in a form of ciphertext, and a corresponding key can also be transferred into the enclave through remote attestation. Subsequently, the data can be used for operations under encryption protection of the CPU, and a result is returned in a form of ciphertext. In such a mode, a powerful computing capability can be used without worrying about data leakage.

A blockchain scenario is used as an example. After receiving a transaction, a blockchain node in a blockchain network can distinguish a transaction type. For example, the transaction can include a type field, so that the blockchain node can determine, based on a value of the type field, that the transaction is a privacy transaction or a non-privacy transaction. The privacy transaction has a relatively high privacy requirement on a processing process; therefore, the blockchain node needs to process the privacy transaction in a TEE. The non-privacy transaction has a relatively low privacy requirement on a processing process; therefore, the blockchain node can process the non-privacy transaction in a TEE, or in a conventional execution environment different from the TEE. The privacy transaction may stay in an encrypted state (the type field is in a plaintext state). Therefore, the privacy transaction may further need to be decrypted in the TEE before being processed. The non-privacy transaction is usually in the plaintext state.

Security of privacy data involved in the privacy transaction needs to be ensured in both a decryption process and an execution process of the privacy transaction. When the blockchain node supports a hyper-threading technology, the privacy transaction may be allocated to a certain logical processor for processing, and the logical processor can be specifically scheduled to a physical thread of a certain physical processor core on the blockchain node, so that the logical processor can use a computing resource of the physical processor core to process the privacy transaction above. The hyper-threading technology usually supports allocation of two physical threads to one physical processor core, so that two logical processors can share computing resources of one physical processor core. Certainly, a case that more logical processors share one physical processor core is not excluded and is included in the scope of the disclosure. Scheduling operations targeted for logical processors are typically implemented by a hypervisor on a blockchain node. The hypervisor is also referred to as virtual machine monitor (VMM), which is the core of a virtualization technology. In a virtualized environment, hardware resources such as CPUs, memories, hard disks, and network interface cards of a physical machine are virtualized, so that one physical machine (or referred to as a host machine) can be virtualized into multiple virtual machines referred to as "guest machines." These guest machines, or guest operating systems running on the guest machines can share the virtualized hardware resources under coordination of the hypervisor.

Since hyper-threads need to share computing resources such as a level-1 cache of the physical processor core, when the logical processor that processes the privacy transaction is scheduled to a physical thread on the physical processor core, the above-mentioned computing resources that need to be shared may have residual privacy data. If a logical processor allocated to another physical thread of the physical processor core runs an untrusted application, the untrusted application may read the residual privacy data, causing privacy leakage.

Although the hyper-threading technology can be disabled to avoid the above-mentioned privacy leakage for privacy protection, processing efficiency is reduced when no privacy protection is required, for example, in a scenario in which the blockchain node processes the non-privacy transaction. Similarly, in addition to the blockchain scenario, there are similar problems of imbalance between efficiency and privacy in other scenarios. Therefore, the present specification proposes a secure scheduling solution for hyper-threading scenarios, which can take into account both efficiency improvement and privacy protection requirements brought by hyper-threading.

Figure 1:
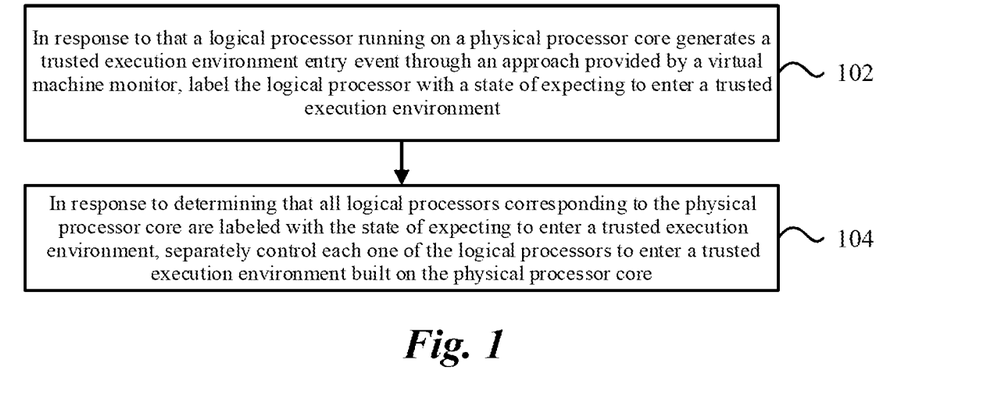
FIG. 1 is a flowchart illustrating a method for securely entering a trusted execution environment in a hyper-threading scenario according to an example implementation.

FIG. 1 is a flowchart illustrating a secure scheduling method for synchronously entering a trusted execution environment in a hyper-threading scenario according to an example implementation. As shown in FIG. 1, the method can include the following steps.

Step 102: In response to that a logical processor running on a physical processor core generates a trusted execution environment entry event through an approach provided by a virtual machine monitor, label the logical processor with a state of expecting to enter a trusted execution environment.

The physical processor core belongs to a CPU in a physical machine, and each CPU can include one or more physical processor cores. On a physical machine, a guest machine can be formed based on a virtualization technology, and each guest machine can form one or more logical processors. Therefore, in the present specification, when multiple logical processors are involved, these logical processors can come from the same guest machine or different guest machines.

A TEE can be built on the physical processor core. In an example of the SGX technology, an enclave can be built on the physical processor core. When a certain logical processor generates a trusted execution environment entry event, it indicates that an application program in the logical processor expects to enter the enclave built on the physical processor core.

The hypervisor can provide the application program with an approach to enter the TEE so that a trusted execution environment entry event generated based on the approach can be effectively distinguished from a trusted execution environment entry event generated based on another approach, so as to identify whether the application program is malicious. In general, a trusted application is set to use the approach provided by hypervisor to enter the TEE, while an untrusted application chooses another approach in order to avoid control by the hypervisor. As such, whether the application is trusted can be distinguished. Certainly, if the untrusted application uses the approach provided by the hypervisor to enter the TEE, the untrusted application can also be identified through other dimensions without causing misjudgment. It can be determined that, in the method above, it can be determined whether and when an application program in a logical processor enters a TEE, and it is possible to determine an approach for entering the TEE as requested by the application program. The logical processor is labeled with a state of expecting to enter a trusted execution environment only when the application program enters the TEE via the approach provided by the hypervisor. As such, the application program running in the logical processor has an opportunity to enter the TEE built on the physical processor core.

Figure 2:
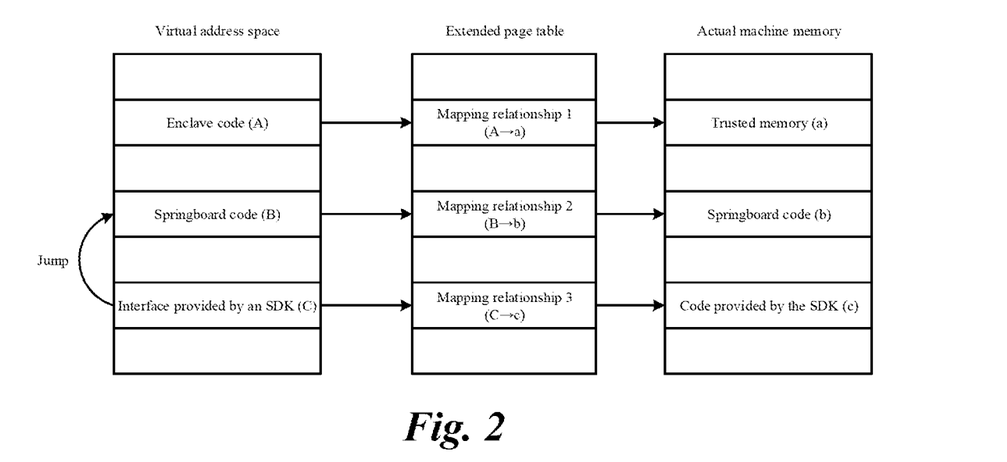
FIG. 2 is a schematic diagram illustrating access to a physical machine memory by a guest machine according to an example implementation.

When a logical processor runs an application program, a memory access operation uses a virtual address space shown in FIG. 2, and an extended page table is used to map the virtual address space to a physical machine memory in a physical machine, that is, to map a virtual address in the virtual address space to an address in the physical machine memory. For example, after reading address "A" in the virtual address space, the logical processor can map address "a" to address "a" in the physical machine memory by using mapping relationship 1 in the extended page table, so as to implement access to a trusted memory EPC corresponding to an enclave, that is, to enter the enclave. Similarly, after reading address "B" in the virtual address space, the logical processor can map address "B" to address "b" in the physical machine memory by using mapping relationship 2 in the extended page table to read springboard code. In addition, after reading address "C" in the virtual address space, the logical processor can map address "C" to address "c" in the physical machine memory by using mapping relationship 3 in the extended page table to read code provided by an SDK included in the application program in the logical processor. Certainly, in addition to the above-mentioned code, the physical machine memory can further store other data required for running, which is not limited in the present specification.

With mapping relationship 1 in the extended page table, the logical processor can directly enter the enclave without any control, which causes the security risk described above. Therefore, in the present specification, the hypervisor can be used to monitor an enclave creation process, and then control mapping relationship 1 in the extended page table. For example, the hypervisor can pre-configure a switch condition for switching from a non-root mode to a root mode. The switch condition includes detecting that a virtual machine executes a trusted execution environment building instruction. The trusted execution environment building instruction is used to create a TEE, for example, the enclave described above. The non-root mode, also called a non-root operation, is a mode in which a guest machine (referred to as virtual machine for short) runs. The root mode, also called a root operation, is a mode in which the hypervisor runs. Setting the trusted execution environment building instruction as the above-mentioned switch condition is actually setting the trusted execution environment building instruction as a sensitive instruction in the non-root mode. Execution of the sensitive instruction will cause a "trap," namely, a VM exit operation. The VM exit operation will trigger automatic switching from the non-root mode to the root mode, causing a CPU control right to be handed over from the guest machine (or a guest operating system run on the guest machine) to the hypervisor. Consequently, the trusted execution environment building instruction fails to execute, and further the hypervisor is involved in the TEE creation process.

If the hypervisor finds that the VM exit (namely, the switching from the non-root mode to the root mode) is caused by the trusted execution environment building instruction and the hypervisor allows that a TEE be created, the hypervisor can replace the guest machine to execute the trusted execution environment building instruction described above to complete the TEE creation and then re-enter a virtualization state. For example, the hypervisor can initiate a VM entry operation to switch from the root mode back to the non-root mode. In the SGX technology, the above-mentioned trusted execution environment building instruction can be an ENCLS[EADD] instruction and an ENCLS[EINIT] instruction. The ENCLS[EADD] instruction is used to add a specified memory page as an EPC corresponding to an enclave to be created, and involves generating a mapping relationship (for example, mapping relationship 1 shown in FIG. 2) from a virtual address to the EPC in an extended page table. Execution of the ENCLS

[EINIT] instruction indicates that the EPC has been added, which is equivalent to sealing the enclave.

The hypervisor needs to perform other operations in addition to executing the ENCLS[EADD] instruction and the ENCLS[EINIT] instruction to create the enclave. For example, assuming that mapping relationship 1 in the extended page table shown in FIG. 2 corresponds to the enclave created above, the hypervisor can restrict the application program from entering the enclave directly through mapping relationship 1. In this case, the hypervisor can configure mapping relationship 1 as having read and write permissions but not an execution permission, or the hypervisor can refuse to generate mapping relationship 1 in the extended page table. Certainly, an EPC memory range is usually predetermined and fixed. Therefore, mapping relationship 1 above can cover the entire EPC memory range and is set as having no execution permission, so that mapping relationship 1 is set to correspond to all enclaves, without having to temporarily set a corresponding mapping relationship in the extended page table after each enclave creation or setting the mapping relationship as having no execution permission. Accordingly, when the application program in the logical processor enters the enclave through the extended page table, a page table translation error will be caused as mapping relationship 1 is non-executable or does not exist, causing a VM exit. By locating a cause for the VM exit, the hypervisor can identify an intent of the application program on directly entering the enclave, and further determine that the application program may be an untrusted application. Such practice can avoid scheduling a logical processor running the untrusted application to enter the enclave and prevent the untrusted application from stealing privacy data. Therefore, a VM exit can be triggered when an extended page table translation error occurs and it is identified that an instruction for entering a trusted execution environment (for example, an ENCLS[EENTER] instruction in the SGX technology) is executed. By locating a cause for the VM exit, the hypervisor can detect a trusted execution environment entry event and determine that the trusted execution environment entry event is generated by any logical processor by directly accessing a trusted execution environment built on a physical processor core.

In the present specification, the hypervisor provides multiple secure approaches used to enter the enclave. First approach: The present specification can provide a new hypercall used to initiate entry into a trusted execution environment, which can be implemented by executing a hypercall TEE entry instruction. The hypercall TEE entry instruction can trigger a VM exit. By locating a cause for the VM exit, the hypervisor can detect a trusted execution environment entry event, and determine that the trusted execution environment entry event is generated by any logical processor through the approach provided by the hypervisor, and further the hypervisor helps the logical processor enter the TEE. Second approach: As described above, since mapping relationship 1 cannot be used to enter the enclave, the hypervisor can add mapping relationship 2 shown in FIG. 2 to the extended page table. Mapping relationship 2 can be used to map to the springboard code at address "b," and the springboard code can be executed by any logical processor to help the logical processor enter the TEE. Although the second approach does not trigger a VM exit, it can still be considered that the approach is provided by the hypervisor because the springboard code is provided by the hypervisor. Third approach: The first approach and the second approach are combined. The springboard code provided by the hypervisor can include the above-mentioned hypercall TEE entry instruction, so that after executing the springboard code, any logical processor can enter a TEE with the assistance of the springboard code and the hypervisor. These approaches will be described in detail below.

Step 104: In response to determining that all logical processors corresponding to the physical processor core are labeled with the state of expecting to enter a trusted execution environment, separately control each one of the logical processors to enter a trusted execution environment built on the physical processor core.

Figure 3:
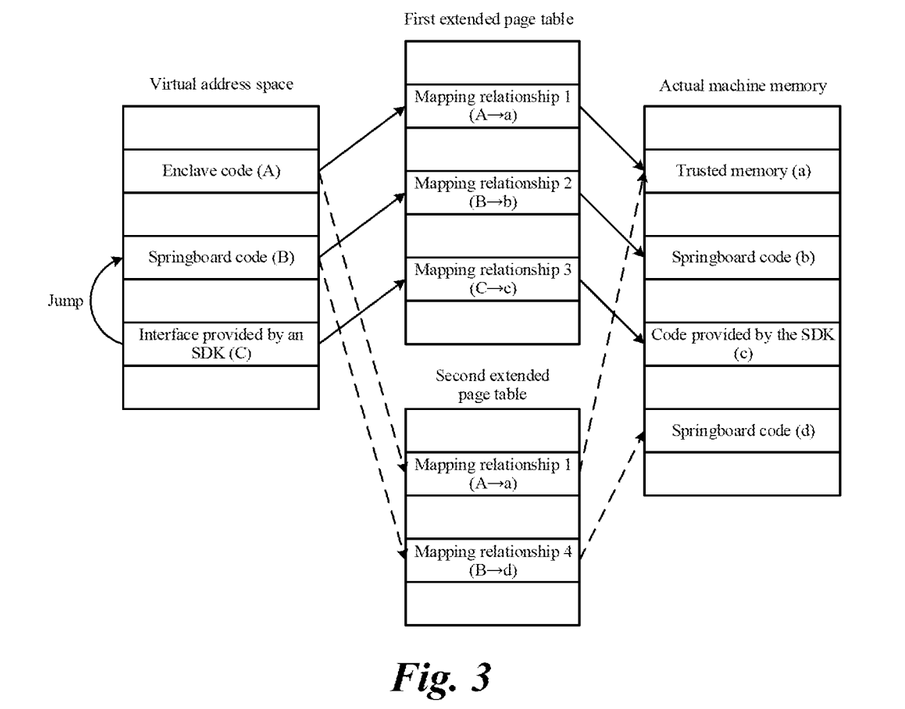
FIG. 3 is a schematic diagram illustrating access to a physical machine memory by another guest machine according to an example implementation.

After the above-mentioned enclave creation is completed, the hypervisor can create another extended page table different from the extended page table shown in FIG. 2 for the enclave, so as to schedule the logical processor to enter the enclave. It is assumed that the extended page table shown in FIG. 2 is a first extended page table, the first extended page table is an extended page table used by the guest machine by default, and mapping relationship 1 in the first extended page table is non-executable or does not include mapping relationship 1. Another extended page table created by the hypervisor for the created enclave is a second extended page table. As shown in FIG. 3, the second extended page table includes mapping relationship 1 having read, write, and execution permissions and the like, and includes mapping relationship 4 used to map springboard code.

For the implementation shown in FIG. 3, a process in which a trusted application enters the enclave can include:

If the first approach is adopted, a logical processor running the trusted application can directly execute the above-mentioned hypercall TEE entry instruction, and the hypercall instruction can trigger a VM exit. Consequently, a CPU control right is handed over from a guest machine to the hypervisor. If the hypervisor determines that the logical processor is allowed to enter the enclave, the hypervisor first switches a page table used by the logical processor from the first extended page table to the second extended page table; then, labels the logical processor with a state of expecting to enter the enclave; and finally, keeps waiting until all the logical processors on the CPU are labeled with the state of expecting to enter the enclave. In this case, it can be ensured that an untrusted application cannot use the CPU resources and sensitive data generated by the enclave will not be stolen. The hypervisor can trigger a return to virtualization, so as to hand over the CPU control right to the guest machine. As such, each logical processor can enter the enclave by executing the TEE entry instruction. The TEE entry instruction is used to enter a TEE. For example, in the SGX technology, the TEE entry instruction can be ENCLS [EENTER] or ENCLS[ERESUME], which is used to enter or re-enter an enclave.

If the second approach is adopted, a predefined interface can be provided in an SDK of the trusted application. The predefined interface is located at address "C" in the virtual address space, so that the logical processor running the trusted application can map address "C" through the first extended page table used by default, for example, to address "c" in the physical machine memory based on mapping relationship 3. Code provided by the SDK is stored at address "c," and the logical processor can jump to address "B" in the virtual address space by executing the code. Therefore, the trusted application will be set to reach address "B" in the virtual address space provided that the trusted application follows the method provided by the SDK. Further, address "B" will be mapped to address "b" in the physical machine memory through mapping relationship 2 in the first extended page table. As such, the logical processor running the trusted application executes the springboard code at address "b." An untrusted application will choose to directly enter the enclave through address "A," but such an entry cannot be executed due to the reason described above.

In the physical machine memory, two pieces of springboard code (which can further include relevant data) are stored at address "b" and address "d," respectively. The contents of these two pieces of springboard code are identical, except that the springboard code at address "b" is controlled by the guest machine while the springboard code at address "d" is controlled by the hypervisor. Certainly, the two pieces of springboard code do not have to be exactly identical. Processing differences in different cases are discussed below. Regardless of whether the springboard code at address "b" is the identical to that at address "d," at least the following should be ensured: The springboard code at address "b" includes a page table switch instruction for switching the first extended page table to the second extended page table, so that when executing the springboard code at address "b," the logical processor running the trusted application can ensure that it executes the page table switch instruction to switch the used extended page table from the first extended page table to the second extended page table. Then, when using the second extended page table, the logical processor can read the springboard code at address "d" through mapping relationship 4 included in the second extended page table. The springboard code at address "d" should include at least an instruction for labeling a logical processor with a state and an instruction for controlling a logical processor to enter a trusted execution environment. Since the springboard code is provided by the hypervisor, the execution of the springboard code by the logical processor indicates that the logical processor employs a secure approach provided by the hypervisor. Therefore, when executing the springboard code at address "d," the logical processor can execute the above-mentioned instruction for labeling a logical processor with a state, so as to label the logical processor itself with a state of expecting to enter an enclave; and the logical processor can execute the above-mentioned instruction for controlling a logical processor to enter a trusted execution environment. This instruction can include two parts: In a first part, the logical processor keeps waiting until all the logical processors on the CPU are labeled with the state of expecting to enter an enclave; and a second part is the TEE entry instruction, so that the logical processor can enter the enclave accordingly.

It can be determined that, for the springboard code at address "b," as other instructions in the springboard code at address "b" will not be executed after switching from the first extended page table to the second extended page table, any type of instruction can be included after the above-mentioned page table switch instruction for switching the first extended page table to the second extended page table. Similarly, for the springboard code at address "d," any type of instruction can be included before the instruction for labeling a logical processor with a state and the instruction for controlling a logical processor to enter a trusted execution environment, provided that these two instructions are included in the springboard code at address "d." Therefore, it can also be considered that, in this case, the springboard code actually includes a springboard code portion at address "b," where the springboard code portion includes the page table switch instruction for switching the first extended page table to the second extended page table; and another springboard code portion at address "d," where the springboard code portion includes the instruction for labeling a logical processor with a state and the instruction for controlling a logical processor to enter a trusted execution environment.

If the third approach is adopted, the springboard code includes the hypercall TEE entry instruction, and the springboard code can further include the page table switch instruction that is located before the hypercall TEE entry instruction and used to switch the first extended page table to the second extended page table. Therefore, when the above-mentioned trusted application executes the springboard code at address "b," the following occurs: ① The first extended page table is first switched to the second extended page table, so that when the logical processor executes springboard code at address "b," mapping relationship 2 in the first extended page table will be switched to mapping relationship 4 in the second extended page table due to a mapping relationship corresponding to address "b," and consequently, the logical processor will be set to execute the springboard code controlled by the hypervisor at address "d." Therefore, even if the guest machine tampers with the springboard code at address "b," the guest machine is still under control by the hypervisor. ② The hypercall TEE entry instruction in the springboard code is executed, where the hypercall instruction causes a VM exit, and then the hypervisor takes control. Similar to the second approach, any type of instruction can be included after the page table switch instruction for switching the first extended page table to the second extended page table, as long as it is ensured that the springboard code at address "b" includes the page table switch instruction; and any type of instruction can be included before the hypercall TEE entry instruction, as long as the springboard code at address "d" includes the hypercall instruction. Therefore, it can also be considered that, in this case, the springboard code actually includes a springboard code portion at address "b," where the springboard code portion includes the page table switch instruction for switching the first extended page table to the second extended page table; and another springboard code portion at address "d," where the springboard code portion includes the hypercall TEE entry instruction.

After exiting virtualization through the above-mentioned hypercall TEE entry instruction, if the hypervisor allows the logical processor initiating the hypercall to enter the enclave, a label is added to the logical processor, and it is necessary to ensure that the logical processor re-enters a virtualized environment when logical processors to which all physical threads of the physical processor core are allocated are labeled with the state of expecting to enter an enclave. As such, these logical processors can synchronously enter the enclave by executing the TEE entry instruction.

It should be noted that in the present specification, the application programs in the logic processors running on the CPU can enter the same enclave, for example, separately enter different instances corresponding to the same enclave. Alternatively or additionally, the application programs in the logic processors can enter different enclaves, while it should be ensured that all the enclaves are mutually trusted for these application programs.

The hypervisor is trusted in the solutions of the present specification. Therefore, the trusted application further trusts an approach provided by the hypervisor to enter a TEE by trusting the hypervisor. Certainly, if reliability of the hypervisor is in doubt, trustiness of the hypervisor can be verified. Upon startup, the physical machine can generate metrics on code corresponding to the hypervisor by using a TPM chip, and an application program that doubts the hypervisor can obtain the metrics generated by the TPM chip to verify whether the hypervisor is tampered with. For example, when all the logical processors running on the physical processor core enter the trusted execution environment built on the physical processor core, verification can be performed on the hypervisor, for example, by requesting the metrics generated in a startup process thereof from the TPM chip and comparing the metrics with pre-obtained standard metrics. If the metrics are consistent, it indicates that the hypervisor actually exists and code of the hypervisor is not tampered with. As such, it can be determined that the hypervisor is successfully verified, and it is deemed that all application programs entering the TEE are set to be trusted applications controlled by the hypervisor. Therefore, the logical processor above can process privacy data in the trusted execution environment built on the physical processor core without worrying about privacy leakage. Certainly, the existence and security of the hypervisor can be verified in other ways in addition to relying on the TPM platform. The present specification sets no limitation thereto. Generally, the hypervisor needs to be verified only upon the first entry into the TEE, and no verification is required subsequently. In addition, the verification on the hypervisor can be implemented by an SDK of the application program described above. Certainly, other feasible implementation manners are not excluded.

Figure 4:
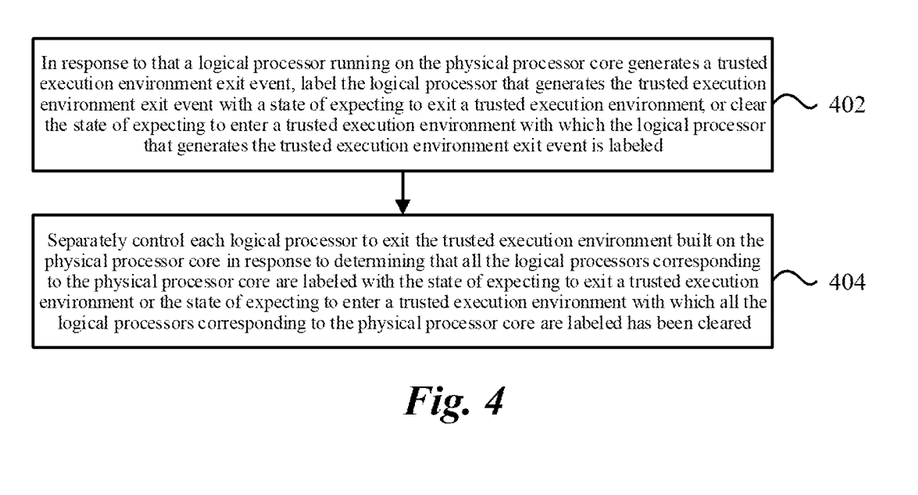
FIG. 4 is a flowchart illustrating a method for securely exiting a trusted execution environment in a hyper-threading scenario according to an example implementation.

In addition to controlling a process of entering a TEE, the hypervisor can control an exit from the TEE, so that the logical processors to which all the physical threads of the physical processor core are allocated can synchronously exit the TEE, thereby ensuring that the physical processor core is always exclusively occupied by a trusted application through synchronous entry and synchronous exit. For example, FIG. 4 is a flowchart illustrating a secure scheduling method for synchronously exiting a trusted execution environment in a hyper-threading scenario according to an example implementation. As shown in FIG. 4, the method can include the following steps.

Step 402: In response to that a logical processor running on the physical processor core generates a trusted execution environment exit event, label the logical processor that generates the trusted execution environment exit event with a state of expecting to exit a trusted execution environment, or clear the state of expecting to enter a trusted execution environment with which the logical processor that generates the trusted execution environment exit event is labeled.

An application program in the logical processor can proactively request exiting a TEE. The present specification can provide a hypercall TEE exit instruction, and a logical processor that has entered a TEE can cause a VM exit by executing the hypercall instruction, thereby invoking the hypervisor. As such, after locating a cause for the VM exit, the hypervisor can determine that the logical processor requests to exit the TEE. With the above-mentioned method, the logical processor can be prevented from directly exiting the TEE, thereby ensuring that all logical processors on the same physical processor core can synchronously exit the TEE under control of the hypervisor.

When a certain logical processor running on the physical processor core expects to exit the TEE, the logical processor can execute the hypercall TEE exit instruction to trigger a VM exit, so that the hypervisor obtains a CPU control right. Then, when the hypervisor identifies that the VM exit is triggered by the execution of the hypercall TEE exit instruction by the logical processor, the logical processor can be labeled with the state of expecting to exit a trusted execution environment, or the state of expecting to enter a trusted execution environment with which the logical processor is previously labeled can be cleared.

Accordingly, when at least one logical processor running on the physical processor core is labeled with the state of expecting to exit a trusted execution environment or the state of expecting to enter a trusted execution environment with which the at least one logical processor running on the physical processor core is labeled has been cleared, and there is a remaining logical processor labeled with the state of expecting to enter a trusted execution environment, the hypervisor can send an empty interrupt pre-registered by a guest operating system to the remaining logical processor; and after the remaining logical processor is labeled with the state of expecting to exit a trusted execution environment or the state of expecting to enter a trusted execution environment with which the remaining logical processor is labeled has been cleared, the hypervisor triggers VM entry to return the CPU control right to the guest machine, so that each logical processor separately exits the trusted execution environment built on the physical processor core. Herein, the present specification can provide a hyper-scheduling instruction for registering an empty interrupt, so that the guest machine can trigger a VM exit based on the hyper-scheduling instruction, and the hypervisor can further assist in completing the registration of the empty interrupt above. The empty interrupt pre-registered by the guest operating system is equivalent to that the guest operating system notifies the hypervisor in advance that a certain interrupt is an interrupt used to trigger a TEE exit. Therefore, when the guest operating system receives the interrupt, the guest operating system ignores the interrupt directly because it knows that the interrupt is intended to exit a TEE and a TEE exit action has actually been completed.

In addition to proactively requesting a TEE exit, the logical processor can generate the above-mentioned trusted execution environment exit event due to an interrupt, an exception, or the like. The generation can also cause a VM exit. Therefore, the hypervisor control the logical processor and another logical processor so that all the logical processors can simultaneously exit the TEE. In an example of an interrupt scenario, when a VM exit occurs, the hypervisor can further determine a state of the another logical processor if the hypervisor identifies that the VM exit is caused by occurrence of an interrupt on a certain logical processor. There are three possible states for the another logical processor. In a first state, the another logical processor does not enter a TEE. In a second state, the another logical processor has entered a TEE. In a third state, an extended page table corresponding to the another logical processor has been switched from the first extended page table to the second extended page table, but the another logical processor has not entered a TEE. For the first state, the hypervisor can process the interrupt according to an interrupt processing rule in relevant technologies. For the second and third states, the hypervisor injects an interrupt into the another logical processor described above after performing the following operation.

If all instructions following the page table switch instruction are, for example, no-operation instructions (NOP instructions) in the springboard code at address "b," the hypervisor only needs to switch the extended page table used by the another logical processor above from the second extended page table to the first extended page table, and then re-enter virtualization. Then, the other logic processors above can read the springboard code at address "b" through the first extended page table and execute the NOP instructions following the page table switch instruction, and finally reach a predetermined return address registered in the springboard code.

If the instructions following the page table switch instruction include a non-NOP instruction in the springboard code at address "b," for example, the springboard code at address "b" is consistent with the springboard code at address "d" in terms of content, the hypervisor needs to switch the extended page table used by the another logical processor above from the second extended page table back to the first extended page table, and further needs to proactively rewrite a return address of the another logical processor to be a predetermined return address corresponding to the first extended page table, and then re-enter virtualization. Such practice ensures that the another logical processor can directly exit and go to the predetermined return address, without causing an error due to the execution of the non-NOP instructions following the page table switch instruction in the springboard code at address "b."

In the two cases above, the hypervisor needs to proactively switch the second extended page table back to the first extended page table because the second extended page table is configured such that only an EPC memory and the springboard code at address "d" are executable, while another memory is not mapped or is mapped but non-executable, and therefore the second extended page table cannot be used to process interrupts. Therefore, after switching back to the first extended page table, the interrupt injected by the hypervisor into the another logical processor can be responded to normally, and further, all the logical processors can synchronously exit the TEE.

Step 404: Separately control each logical processor to exit the trusted execution environment built on the physical processor core in response to determining that all the logical processors corresponding to the physical processor core are labeled with the state of expecting to exit a trusted execution environment or the state of expecting to enter a trusted execution environment with which all the logical processors corresponding to the physical processor core are labeled has been cleared.

As described above, by managing the state of each logical processor, the hypervisor can ensure that all logical processors on the same physical processor core can exit a TEE synchronously without having some logical processors exit the TEE while some others do not exit the TEE, thereby ensuring that the trusted application can exclusively occupy the physical processor core.

Figure 5:
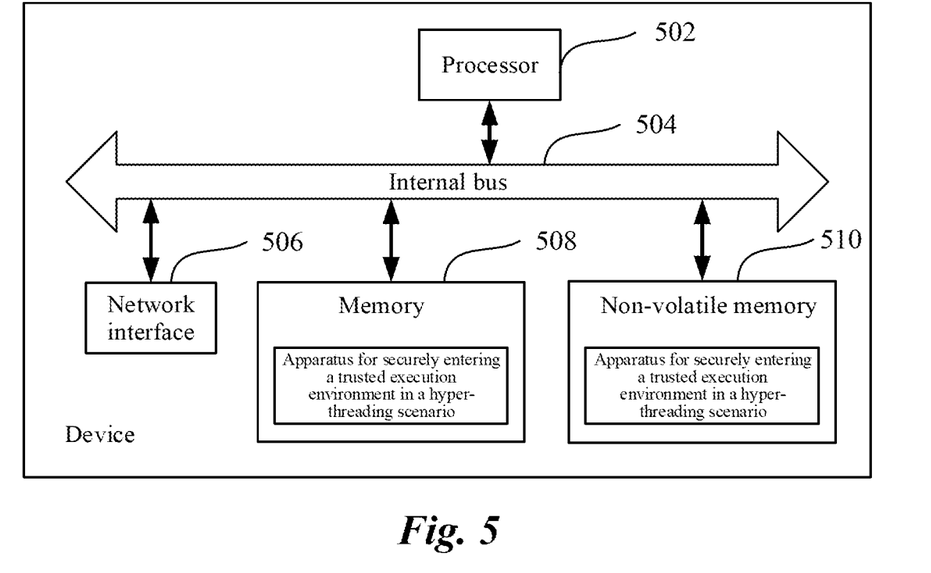
FIG. 5 is a schematic structural diagram illustrating a device according to an example implementation.

FIG. 5 is a schematic structural diagram illustrating a device according to an example implementation. Referring to FIG. 5, in terms of hardware, the device includes a processor 502, an internal bus 504, a network interface 506, a memory 508, and a non-volatile memory 510, and certainly can further include hardware needed by other services. The processor 502 reads a corresponding computer program from the non-volatile memory 510 to the memory 508 for running, and a secure scheduling apparatus in a hyper-threading scenario is logically formed. Certainly, in addition to a software implementation manner, one or more implementations of the present specification do not exclude another implementation manner, for example, a logic device or a combination of hardware and software. That is, an execution body of the following processing procedure is not limited to each logical unit, and can also be hardware or a logic device.

Figure 6:
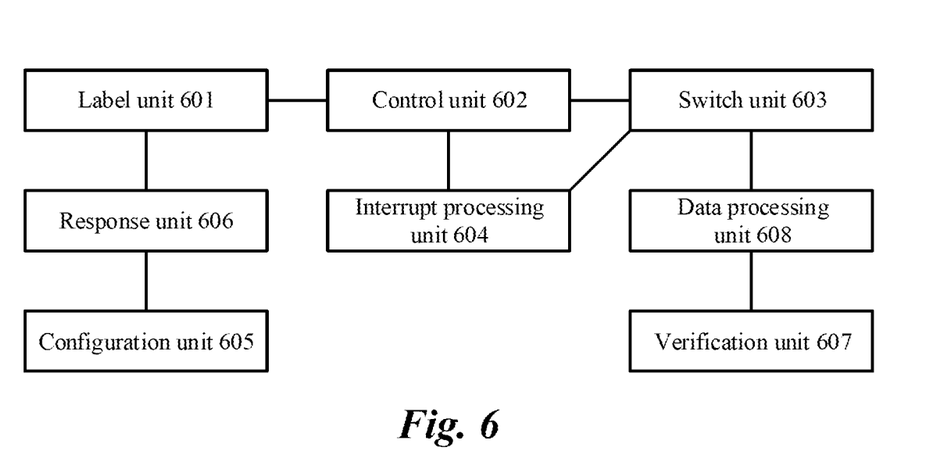
FIG. 6 is a block diagram illustrating an apparatus for securely entering a trusted execution environment in a hyper-threading scenario according to an example implementation.

Referring to FIG. 6, in a software implementation manner, the secure scheduling apparatus in a hyper-threading scenario can include: a label unit 601, configured to: in response to that a logical processor running on a physical processor core generates a trusted execution environment entry event through an approach provided by a virtual machine monitor, label the logical processor with a state of expecting to enter a trusted execution environment; and a control unit 602, configured to: in response to determining that all logical processors corresponding to the physical processor core are labeled with the state of expecting to enter a trusted execution environment, control each one of the logical processors to enter a trusted execution environment built on the physical processor core.

In some implementations, the generating the trusted execution environment entry event through the approach provided by the virtual machine monitor includes: directly executing a hypercall TEE entry instruction, the virtual machine monitor being configured to label a state of a logical processor and control the logical processor to enter a trusted execution environment; or, executing springboard code provided by the virtual machine monitor, a memory for the springboard code being mapped by a first extended page table used by default, the springboard code including the hypercall TEE entry instruction or an instruction for labeling a state of a logical processor and an instruction for controlling a logical processor to enter a trusted execution environment.

In some implementations, the first extended page table is such configured that a memory of the trusted execution environment is unmapped or non-executable; in a case that the hypercall TEE entry instruction is not included in the springboard code, the virtual machine monitor is further configured to switch the first extended page table to a second extended page table in response to that the trusted execution environment entry event is generated by the logical processor through the approach provided by the virtual machine monitor; or in a case that the hypercall TEE entry instruction is included in the springboard code, the springboard code further includes a page table switch instruction that is located before the hypercall TEE entry instruction and that is used to switch the first extended page table to a second extended page table; or in a case that the hypercall TEE entry instruction is not included in the springboard code, the springboard code further includes a page table switch instruction that is located before the instruction for controlling a logical processor to enter a trusted execution environment and that is configured to switch the first extended page table to a second extended page table; where the springboard code is mapped by the first extended page table to a first memory address controlled by a guest machine and is mapped by the second extended page table to a second memory address controlled by the virtual machine monitor, and the second extended page table is such configured that a memory of a trusted execution environment is executable.

In some implementations, the secure scheduling apparatus in a hyper-threading scenario can further include: a switch unit 603, configured to switch the second extended page table to the first extended page table after any logical processor is controlled to exit the trusted execution environment built on the physical processor core.

In some implementations, the secure scheduling apparatus in a hyper-threading scenario can further include: an interrupt processing unit 604, configured to: in response to that a logical processor running on the physical processor core generates a trusted execution environment exit event due to an interrupt, if another logical processor has entered the trusted execution environment built on the physical processor core, or has switched from the first extended page table to the second extended page table but has not yet entered the trusted execution environment built on the physical processor core, inject an interrupt into the another logical processor after the following operations are performed: in response to that instructions following the page table switch instruction in the springboard code at the first memory address are all no-operation instructions, switching the second extended page table back to the first extended page table; or in response to that instructions following the page table switch instruction in the springboard code at the first memory address include a non-no-operation instruction, switching the second extended page table back to the first extended page table and rewriting a return address of the another logical processor to be a predetermined return address corresponding to the first extended page table; where the control unit 602 separately controls each logical processor to exit the trusted execution environment built on the physical processor core in response to that the logical processors each generate a trusted execution environment exit event.

In some implementations, the secure scheduling apparatus in a hyper-threading scenario can further include: a configuration unit 605, configured to configure a switch condition for switching from a non-root mode to a root mode, the switch condition including detecting that a guest machine executes a trusted execution environment building instruction; and a response unit 606, configured to: in response to the switch condition being met, execute a trusted execution environment building instruction to build the trusted execution environment on the physical processor core.

In some implementations, the determining that all the logical processors running on the physical processor core are labeled with the state of expecting to enter a trusted execution environment includes: determining that all the logical processors running on the physical processor core are labeled as expecting to enter a same trusted execution environment; or determining that all the logical processors running on the physical processor core are separately labeled as expecting to enter different trusted execution environments, and the logical processors trust the trusted execution environments expected to be entered by one another.

In some implementations, the secure scheduling apparatus in a hyper-threading scenario can further include: a verification unit 607, configured to verify the virtual machine monitor in response to that all the logical processors running on the physical processor core are separately scheduled to enter the trusted execution environment built on the physical processor core; and a data processing unit 608, configured to: in response to determining that the virtual machine monitor is successfully verified, process privacy data in the trusted execution environment built on the physical processor core.

In some implementations, the verification unit 607 is specifically configured to: verify the virtual machine monitor by using a trusted platform module.

In some implementations, the label unit 601 is further configured to: in response to that a logical processor running on the physical processor core generates a trusted execution environment exit event, label the logical processor that generates the trusted execution environment exit event with a state of expecting to exit a trusted execution environment, or clear the state of expecting to enter a trusted execution environment with which the logical processor that generates the trusted execution environment exit event is labeled; and the control unit 602 is further configured to separately control each logical processor to exit the trusted execution environment built on the physical processor core in response to determining that all the logical processors corresponding to the physical processor core are labeled with the state of expecting to exit a trusted execution environment or the state of expecting to enter a trusted execution environment with which all the logical processors corresponding to the physical processor core are labeled has been cleared.

In some implementations, the logical processor running on the physical processor core generates the trusted execution environment exit event, including: the logical processor running on the physical processor core initiates a trusted execution environment exit hypercall; or the logical processor running on the physical processor core experiences an interrupt or exception.

In some implementations, the control unit 602 is specifically configured to: in response to that at least one logical processor running on the physical processor core is labeled with the state of expecting to exit a trusted execution environment or the state of expecting to enter a trusted execution environment with which the at least one logical processor running on the physical processor core is labeled has been cleared, and there is a remaining logical processor labeled with the state of expecting to enter a trusted execution environment, send a pre-registered empty interrupt to the remaining logical processor; and separately schedule each logical processor to exit the trusted execution environment built on the physical processor core after the remaining logical processor is labeled with the state of expecting to exit a trusted execution environment or the state of expecting to enter a trusted execution environment with which the remaining logical processor is labeled has been cleared.

The systems, apparatuses, modules, or units illustrated in the previous implementations can be implemented by using a computer chip or an entity, or can be implemented by using a product having a certain function. A typical implementation device is a computer, and the computer can be specifically a personal computer, a laptop computer, a cellular phone, a camera phone, a smartphone, a personal digital assistant, a media player, a navigation device, an email receiving and sending device, a game console, a tablet computer, a wearable device, or any combination of these devices.

In a typical configuration, a computer includes one or more computer processing units (CPUs), an input/output interface, a network interface, and a memory.

The memory can include a non-persistent memory, a random access memory (RAM), a non-volatile memory, and/or another form in a computer readable medium, for example, a read-only memory (ROM) or a flash random access memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD), or another optical storage, a cassette tape, a magnetic disk storage, a quantum memory, a storage medium based on grapheme, another magnetic storage device, or any other non-transmission medium. The computer storage medium can be used to store information accessible by a computing device. Based on the description in the present specification, the computer readable medium does not include transitory computer-readable media (transitory media), for example, a modulated data signal and carrier.

It should be further noted that, the terms "include," "comprise," or their any other variants are intended to cover a non-exclusive inclusion, so a process, a method, a product or a device that includes a list of elements not only includes those elements but also includes other elements which are not expressly listed, or further includes elements inherent to such a process, method, product or device. Without more constraints, an element preceded by "includes a . . . " does not preclude the existence of additional identical elements in the process, method, product or device that includes the element.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing are feasible or can be advantageous.

Terms used in one or more implementations of the present specification are merely used to describe specific implementations, and are not intended to limit the one or more implementations of the present specification. The terms "a" and "the" of singular forms used in one or more implementations of the present specification and the appended claims are also intended to include plural forms, unless otherwise specified in the context clearly. It should also be understood that, the term "and/or" used herein indicates and includes any or all possible combinations of one or more associated listed items.

It should be understood that although terms "first," "second," "third," etc., can be used in one or more implementations of the present specification to describe various types of information, the information is not limited to these terms. These terms are only used to differentiate between information of the same type. For example, without departing from the scope of one or more implementations of the present specification, first information can also be referred to as second information, and similarly, the second information can be referred to as the first information. Depending on the context, for example, the word "if" used herein can be explained as "while," "when," or "in response to determining."

The previous descriptions are only example implementations of one or more implementations of the present specification, but are not intended to limit the one or more implementations of the present specification. Any modification, equivalent replacement, improvement, etc., made without departing from the spirit and principle of the one or more implementations of the present specification shall fall within the protection scope of the one or more implementations of the present specification.

The various embodiments described above can be combined to provide further embodiments. Aspects of the embodiments can be modified, if necessary, to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for securely entering a trusted execution environment in a hyper-threading scenario, comprising:
   in response to that a logical processor running on a physical processor core generates a trusted execution environment entry event through an approach provided by a virtual machine monitor, labeling the logical processor with a state of expecting to enter a trusted execution environment;
   in response to determining that all logical processors corresponding to the physical processor core are labeled with the state of expecting to enter a trusted execution environment, separately controlling each one of the logical processors to enter a trusted execution environment built on the physical processor core;
   verifying the virtual machine monitor in response to that all the logical processors running on the physical processor core separately enter the trusted execution environment built on the physical processor core; and
   in response to determining that the virtual machine monitor is successfully verified, processing privacy data in the trusted execution environment built on the physical processor core.

2. The method according to claim 1, wherein the generating the trusted execution environment entry event through the approach provided by the virtual machine monitor includes:
   directly executing a hypercall trusted execution environment entry instruction, the virtual machine monitor being configured to label a state of the logical processor and control the logical processor to enter the trusted execution environment.

3. The method according to claim 1, wherein the generating the trusted execution environment entry event through the approach provided by the virtual machine monitor includes:
   executing springboard code provided by the virtual machine monitor, a memory for the springboard code being mapped by a first extended page table, the springboard code including a hypercall trusted execution environment entry instruction or an instruction for labelling a state of the logical processor and an instruction for controlling the logical processor to enter the trusted execution environment.

4. The method according to claim 3, wherein the first extended page table is such configured that a memory of the trusted execution environment is unmapped or non-executable;
   wherein the method comprises, in response to that the trusted execution environment entry event is generated by the logical processor through the approach provided by the virtual machine monitor, switching the first extended page table to a second extended page table by at least one of:
   the virtual machine monitor; or
   a page table switch instruction in the springboard code; and
   wherein the springboard code is mapped by the first extended page table to a first memory address controlled by a guest machine and is mapped by the second extended page table to a second memory address controlled by the virtual machine monitor, and the second extended page table is configured such that a memory of the trusted execution environment is executable.

5. The method according to claim 4, comprising:
   switching the second extended page table to the first extended page table after controlling the logical processor to exit the trusted execution environment built on the physical processor core.

6. The method according to claim 4, comprising:
in response to the logical processor running on the physical processor core generating a trusted execution environment exit event due to an interrupt, if another logical processor has entered the trusted execution environment built on the physical processor core, or has switched from the first extended page table to the second extended page table but has not yet entered the trusted execution environment built on the physical processor core, injecting an interrupt into the another logical processor after performing the following operations:
   in response to instructions following the page table switch instruction in the springboard code at the first memory address being all no-operation instructions, switching the second extended page table back to the first extended page table;
   in response to instructions following the page table switch instruction in the springboard code at the first memory address including a non-no-operation instruction, switching the second extended page table back to the first extended page table and rewriting a return address of the another logical processor to be a return address corresponding to the first extended page table; and
   separately controlling each logical processor to exit the trusted execution environment built on the physical processor core in response to that the logical processors each generating the trusted execution environment exit event.

7. The method according to claim 1, comprising:
configuring a switch condition for switching from a non-root mode to a root mode, the switch condition including detecting that a guest machine executes a trusted execution environment building instruction; and
in response to the switch condition being met, executing a trusted execution environment building instruction to build the trusted execution environment on the physical processor core.

8. The method according to claim 1, wherein the determining that all the logical processors running on the physical processor core are labeled with the state of expecting to enter a trusted execution environment includes at least one of:
   determining that all the logical processors running on the physical processor core are labeled as expecting to enter a same trusted execution environment; or
   determining that all the logical processors running on the physical processor core are separately labeled as expecting to enter different trusted execution environments, and the logical processors trust the trusted execution environments expected to be entered by one another.

9. The method according to claim 1, wherein the verifying the virtual machine monitor includes: verifying the virtual machine monitor by using a trusted platform module.

10. The method according to claim 1, comprising:
in response to the logical processor running on the physical processor core generating a trusted execution environment exit event, labeling the logical processor that generates the trusted execution environment exit event with a state of expecting to exit a trusted execution environment, or clearing the state of expecting to enter a trusted execution environment with which the logical processor that generates the trusted execution environment exit event is labeled; and
separately controlling each logical processor to exit the trusted execution environment built on the physical processor core in response to determining that all the logical processors corresponding to the physical processor core are labeled with the state of expecting to exit a trusted execution environment or the state of expecting to enter a trusted execution environment with which all the logical processors corresponding to the physical processor core are labeled has been cleared.

11. The method according to claim 10, wherein the logical processor running on the physical processor core generating the trusted execution environment exit event includes at least one of:
   the logical processor running on the physical processor core initiates a trusted execution environment exit hypercall; or
   the logical processor running on the physical processor core experiences an interrupt or exception.

12. The method according to claim 10, wherein the separately controlling each logical processor to exit the trusted execution environment built on the physical processor core includes:
   in response to at least one logical processor running on the physical processor core being labeled with the state of expecting to exit a trusted execution environment or the state of expecting to enter a trusted execution environment with which at least one logical processor running on the physical processor core is labeled has been cleared, and there is a remaining logical processor labeled with the state of expecting to enter a trusted execution environment, sending an empty interrupt pre-registered by a guest operating system to the remaining logical processor; and
   separately controlling each logical processor to exit the trusted execution environment built on the physical processor core after the remaining logical processor is labeled with the state of expecting to exit a trusted execution environment or the state of expecting to enter the trusted execution environment with which the remaining logical processor is labeled has been cleared.

13. An electronic device, comprising:
a processor; and
a memory having executable instructions stored thereon, the executable instructions, when executed by the processor, enable the processor to implement acts including:
in response to a logical processor running on a physical processor core generating a trusted execution environment entry event through an approach provided by a virtual machine monitor, labeling the logical processor with a state of expecting to enter a trusted execution environment;
in response to determining that all logical processors corresponding to the physical processor core are labeled with the state of expecting to enter a trusted execution environment, separately controlling each one of the logical processors to enter a trusted execution environment built on the physical processor core;
verifying the virtual machine monitor in response to all the logical processors running on the physical processor core separately entering the trusted execution environment built on the physical processor core; and
in response to determining that the virtual machine monitor is successfully verified, processing privacy data in the trusted execution environment built on the physical processor core.

14. The device according to claim 13, wherein the generating the trusted execution environment entry event through the approach provided by the virtual machine monitor includes:
  directly executing a hypercall trusted execution environment entry instruction, the virtual machine monitor being configured to label a state of the logical processor and control the logical processor to enter the trusted execution environment.

15. The device according to claim 13, wherein the generating the trusted execution environment entry event through the approach provided by the virtual machine monitor includes:
  executing springboard code provided by the virtual machine monitor, a memory for the springboard code being mapped by a first extended page table, the springboard code including a hypercall trusted execution environment entry instruction or an instruction for labelling a state of a logical processor and an instruction for controlling a logical processor to enter the trusted execution environment.

16. The device according to claim 15, wherein the first extended page table is configured such that a memory of the trusted execution environment is unmapped or non-executable;
  wherein the acts include, in response to that the trusted execution environment entry event is generated by the logical processor through the approach provided by the virtual machine monitor, switching the first extended page table to a second extended page table by at least one of:
  the virtual machine monitor; or
  a page table switch instruction in the springboard code; and
  wherein the springboard code is mapped by the first extended page table to a first memory address controlled by a guest machine and is mapped by the second extended page table to a second memory address controlled by the virtual machine monitor, and the second extended page table is configured such that a memory of the trusted execution environment is executable.

17. A non-transitory computer-readable storage medium having executable instruction stored thereon, which when executed by a processor configure the processor to implement acts comprising:
  in response to a logical processor running on a physical processor core generating a trusted execution environment entry event through an approach provided by a virtual machine monitor, labeling the logical processor with a state of expecting to enter a trusted execution environment;
  in response to determining that all logical processors corresponding to the physical processor core are labeled with the state of expecting to enter a trusted execution environment, separately controlling each one of the logical processors to enter a trusted execution environment built on the physical processor core;
  in response to a logical processor running on the physical processor core generating a trusted execution environment exit event, labeling the logical processor that generates the trusted execution environment exit event with a state of expecting to exit a trusted execution environment, or clearing the state of expecting to enter a trusted execution environment with which the logical processor that generates the trusted execution environment exit event is labeled; and
  separately controlling each logical processor to exit the trusted execution environment built on the physical processor core in response to determining that all the logical processors corresponding to the physical processor core are labeled with the state of expecting to exit a trusted execution environment or the state of expecting to enter a trusted execution environment with which all the logical processors corresponding to the physical processor core are labeled has been cleared.

18. The storage medium according to claim 17, wherein the acts comprise:
  configuring a switch condition for switching from a non-root mode to a root mode, the switch condition including detecting that a guest machine executes a trusted execution environment building instruction; and
  in response to the switch condition being met, executing a trusted execution environment building instruction to build the trusted execution environment on the physical processor core.

19. The storage medium according to claim 17, wherein the logical processor running on the physical processor core generating the trusted execution environment exit event includes at least one of: the logical processor running on the physical processor core initiates a trusted execution environment exit hypercall; or the logical processor running on the physical processor core experiences an interrupt or exception.

20. The storage medium according to claim 17, wherein the separately controlling each logical processor to exit the trusted execution environment built on the physical processor core includes:
  in response to that at least one logical processor running on the physical processor core being labeled with the state of expecting to exit a trusted execution environment or the state of expecting to enter a trusted execution environment with which at least one logical processor running on the physical processor core is labeled has been cleared, and there is a remaining logical processor labeled with the state of expecting to enter a trusted execution environment, sending an empty interrupt pre-registered by a guest operating system to the remaining logical processor; and
  separately controlling each logical processor to exit the trusted execution environment built on the physical processor core after the remaining logical processor is labeled with the state of expecting to exit a trusted execution environment or the state of expecting to enter a trusted execution environment with which the remaining logical processor is labeled has been cleared.

* * * * *